UNITED STATES PATENT OFFICE.

RICHARD A. BOYER, OF VAILSBURG, AND FRED KINNEY, OF SOUTH BOUNDBROOK, NEW JERSEY.

INCUBATOR.

No. 805,444.  Specification of Letters Patent.  Patented Nov. 28, 1905.

Application filed September 19, 1904. Serial No. 224,989.

*To all whom it may concern:*

Be it known that we, RICHARD A. BOYER, residing at Vailsburg, in the county of Essex, and FRED KINNEY, residing at South Boundbrook, in the county of Somerset, State of New Jersey, citizens of the United States, have invented certain new and useful Improvements in Incubators; and we do hereby declare the following to be a full, clear, and exact description of the invention, such as will enable others skilled in the art to which it appertains to make and use the same, reference being had to the accompanying drawings, and to figures of reference marked thereon, which form a part of this specification.

The objects of this invention are to provide a poultry-incubator which will require little personal attention and that only at considerable intervals of time, to thus lessen the expense of tending the incubator and reduce the risk of losing the eggs through inadvertence or carelessness on the part of the operator, to dispense with the use of a lamp for maintaining heat in the incubator, to secure better ventilation and supply of moisture to the eggs, and to obtain other advantages and results, some of which may be hereinafter referred to in connection with the description of the working parts.

The invention consists in the improved poultry-incubator and in the arrangements and combinations of parts of the same, all substantially as will be hereinafter set forth, and finally embraced in the clauses of the claim.

Figure 1:
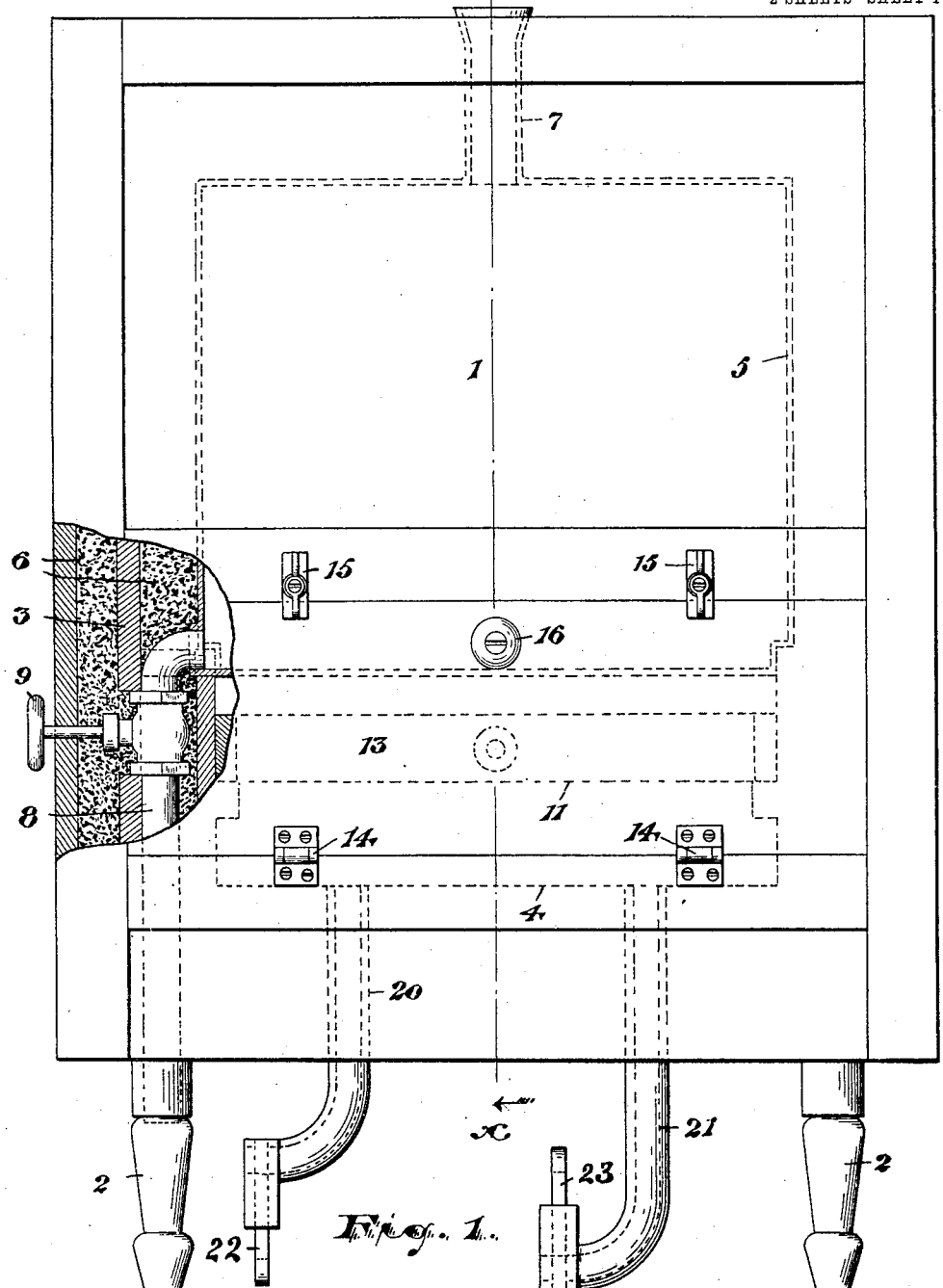
Figure 2:
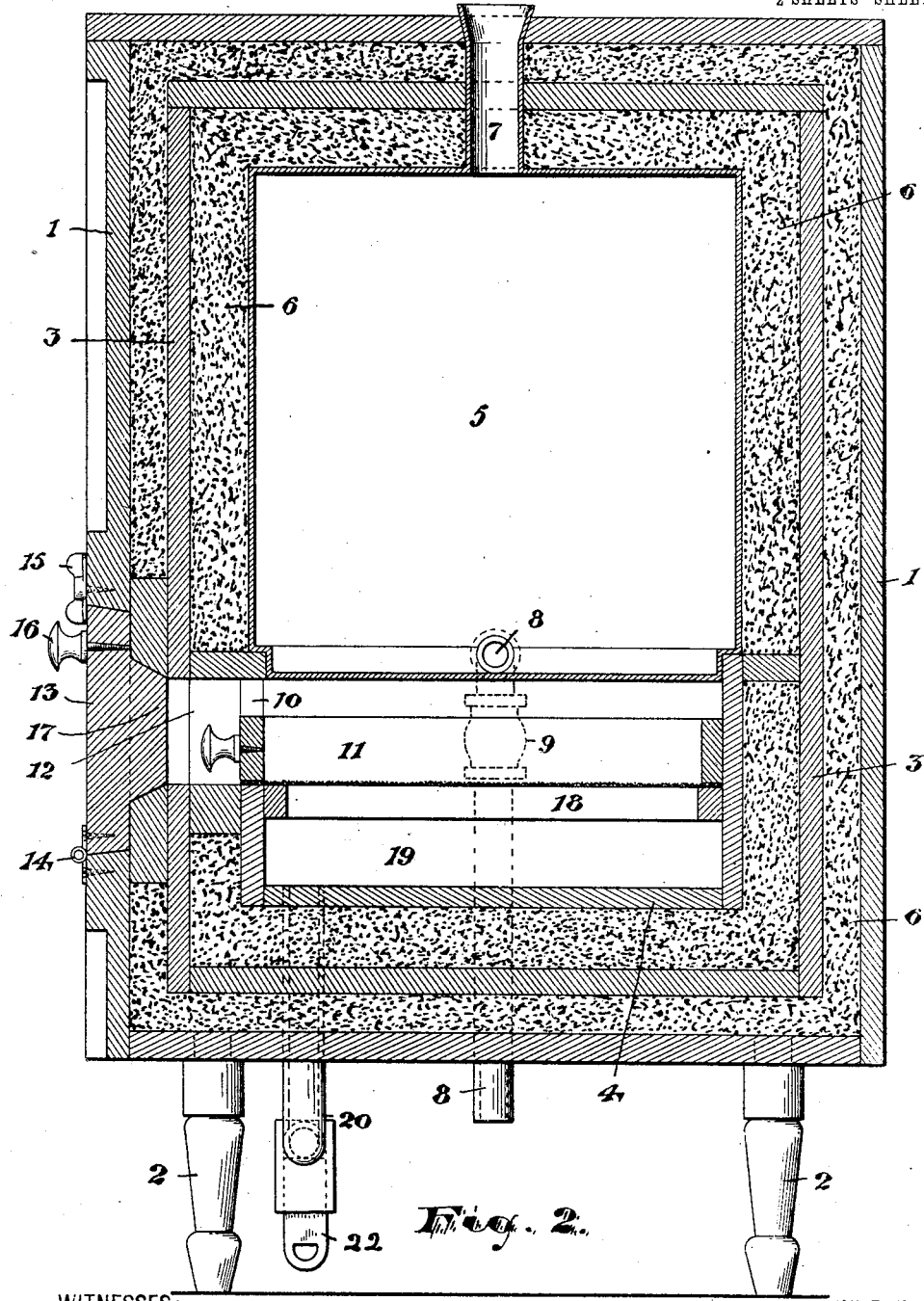

Referring to the accompanying drawings, in which like figures of reference indicate corresponding parts in each of the several figures, Figure 1 is a front elevation of an incubator of our improved construction having a portion thereof broken away to show a certain tank-outlet and valve therefor more clearly. Fig. 2 is a central vertical section taken from front to rear of the incubator, as on line *x*, Fig. 1, looking in the direction indicated by the arrow.

In said drawings, 1 indicates an outer casing, preferably of wood and mounted upon suitable legs 2, adapted to raise it off the floor. Said casing may be of any desired shape, though preferably rectangular, and may obviously vary in size for different capacities of incubators. Within said outer casing is an inner casing 3, separated from the outer casing by a space on all sides, said space being adapted to receive a certain packing, hereinafter described, which is non-conductive of heat. Within the inner casing 3 and in the lower part thereof is arranged a box 4, which is open at the top and adapted to have set thereon a reservoir 5, which occupies the upper portion of the inner casing 3. Said box 4 and reservoir 5 are sufficiently smaller than the casing 3 to afford a space between themselves and said casing, which is also packed in the same manner as the space above referred to between the inner and outer casings.

The packing, which is non-conductive of heat and placed between the casings and tank 5, as described, is designated by reference-figure 6 in the drawings and is composed of sawdust and lime mixed as follows: About one part of slightly air-slaked lime is used to two parts of sawdust, said constituents being thoroughly mixed and then filled in between the casings slowly and gradually, successive layers being lightly sprinkled or moistened with water and carefully packed or tamped as the filling progresses. The result is a hard solid wall which is non-conductive of heat in a high degree and peculiarly adapted to prevent radiation or conduction from the tank 5 and box 4. Said tank 5 is made of sheet metal in any manner common to the art and is provided at its top with a neck 7, which projects at the top of the incubator for filling purposes, it being understood that said tank is to contain hot water. A drain or outlet pipe 8 leads from the lower part of the reservoir 5 to a point outside of the casings, preferably emerging through the bottom of the incubator, and a valve 9 of any suitable kind controls said drain-pipe.

The upper part of the box 4 is at the front of the incubator apertured, as at 10, to receive a drawer 11 for holding eggs, and obviously said aperture must be continued, as by a passage 12, through the packing and casings of the incubator. A door 13, fitted flush with the outer casing 1, is adapted to close the passage-way 12, said door being preferably hinged at its lower edge 14 and having fastening means, such as buttons 15, at its upper edge. A knob 16 affords a hand grasp of the door, and obviously said door may be thickened at its inner side, as at 17, or otherwise rendered more impervious to the escape of heat in any manner known to the art.

The drawer 11 slides upon cleats 18, which are considerably above the lower portion of the box 4, so as to provide a space 19 for air and moisture below the tray or drawer. For applying said air and moisture to said space 19 tubes 20 21 extend downward therefrom and projecting through the bottom of the incubator curve laterally, so as to each provide an end opening disposed in a vertical plane. The one 20 of said tubes which is for air terminates considerably above the ground-level, while the other or moisture tube 21 is as long as the legs 2 of the incubator, so as to lie close to the ground. Both tubes have valves 22 23, respectively, for regulating the passage of air and moisture through them.

In operation the incubator is prepared for use by filling the tank 5 with hot water and letting the same stand until a uniform temperature in the box 4 of 103°, or thereabout, is obtained. In securing this temperature the tank may be cooled by withdrawing a portion of the hot water and replacing it with cold or may be heated by withdrawing a portion of the water and replacing it with hotter. When finally the uniform temperature desired has been obtained, the eggs are inserted and no more attention is necessary until the temperature begins to fall, which has been found in practice to be about five days. At such time a little of the water in the tank 5 is withdrawn and hotter water supplied, and this process is repeated as often as may be necessary in the period of twenty-one days required for hatching.

By our construction we therefore obtain great simplicity in manufacture and in operation, and not nearly so high a degree of carefulness in running the incubator is required as heretofore.

Ordinarily sufficient moisture is supplied through the moisture-tube 21 from the moistness of the ground, especially if the ground around the said tube is sprinkled; but in case of too great dryness a dish of water may be set so as to inclose the lower end of the moisture-tube 21. Sufficient circulation through the tubes 20 and 21 is induced by the ordinary and necessary opening of the door 13, except in extraordinary cases, and then a more permanent opening from the top of the chamber 19 may be provided by loosening the door slightly or in any other suitable way.

Having thus described the invention, what we claim as new is—

1. In an incubator, the combination with a body portion providing an interior chamber, means for heating the same, an egg-drawer in said chamber, and supporting-legs for said body portion, of a moisture-tube leading from said chamber through the bottom of the body portion of the incubator and being approximately of the same length as the said supporting-legs, whereby said moisture-tube terminates close to the ground.

2. In an incubator, the combination with a body portion providing an interior chamber, means for heating the same, an egg-drawer in said chamber, and supporting-legs for said body portion, of a moisture-tube leading from said chamber through the bottom of the body portion of the incubator and being approximately of the same length as the said supporting-legs, whereby said moisture-tube terminates close to the ground, and valve means at the extremity of said tube.

3. In an incubator, the combination with a body portion providing an interior chamber, means for heating the same, an egg-drawer in said chamber, and supporting-legs for said body portion, of a moisture-tube leading from said chamber through the bottom of the body portion of the incubator and being approximately of the same length as the said supporting-legs, whereby said moisture-tube terminates close to the ground, and a ventilating-tube also leading from said chamber through the bottom of the body portion of the incubator and terminating adjacent thereto.

4. In an incubator, the combination with a body portion providing an interior chamber, means for heating the same, an egg-drawer in said chamber, and supporting-legs for said body portion, of ventilating and moisture tubes leading from said chamber through the bottom of the body portion of the incubator, the moisture-tube being longer than the ventilating-tube, valve means at the extremities of said tubes, and supporting means for the incubator projecting below the same a distance substantially equal to the moisture-tube.

5. In an incubator, the combination with a chamber, means for heating the same and an egg-drawer adapted to slide in said chamber, of ventilating and moisture tubes leading from said chamber through the bottom of the incubator and providing open ends disposed in vertical planes, the moisture-tube being longer than the ventilating-tube, and supporting means for the incubator projecting below the same a distance substantially equal to the moisture-tube.

In testimony that we claim the foregoing we have hereunto set our hands.

RICHARD A. BOYER.
FRED KINNEY.

Witnesses:
CHARLES H. PELL,
M. V. DOYLE.